Figure 1:
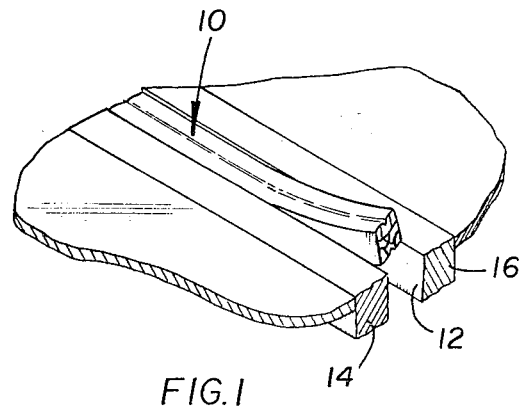

United States Patent
Trieste et al.

[15] 3,653,305
[45] Apr. 4, 1972

[54] SEALING DEVICE

[72] Inventors: Mario R. Trieste, Rockville Centre, N.Y.; Kenneth Hall, Saginaw; Samuel McCrady, Birmingham, both of Mich.

[73] Assignee: Elastomer Seals, Inc., Birmingham, Mich.

[22] Filed: Sept. 2, 1970

[21] Appl. No.: 69,014

[52] U.S. Cl. ................................................94/18
[51] Int. Cl. ..........................................E01c 11/10
[58] Field of Search ..........................94/18; 14/16

[56] References Cited

UNITED STATES PATENTS

| | | | |
|---|---|---|---|
| 3,485,149 | 12/1969 | Boney | 94/18 |
| 3,179,026 | 4/1965 | Crone | 94/18 |
| 3,276,336 | 10/1966 | Crone | 94/18 |
| 3,358,568 | 12/1967 | Brown | 94/18 |

Primary Examiner—Jacob L. Nackenoff
Attorney—Bauer & Amer

[57] ABSTRACT

A comparatively wide, extruded elastomeric sealing strip, for sealing expansion grooves in bridges or the like, having a wall construction including a transversely oriented internal wall to resist lateral compression thereof and a criss-crossed arrangement of walls supporting the transverse wall from below, such wall construction having the unique feature of a sufficient number of internal walls as to obviate a length in any one such wall that might collapse under its own weight prior to completion of the curing of the elastomeric, and yet not having that great a number of walls as to complicate the fabrication of the device by extrusion.

1 Claim, 4 Drawing Figures

Patented April 4, 1972

3,653,305

INVENTORS
MARIO R. TRIESTE
KENNETH HALL
BY  SAMUEL MC CRADY

*Bauer & Amer*
ATTORNEYS

SEALING DEVICE

The present invention relates generally to sealing devices or strips for the expansion grooves of bridges or like construction, and more particularly to an improved elastomeric seal capable of achieving a sealing function in a groove of a comparatively large lateral extent and yet still having a construction which lends itself to economical mass production by extrusion.

A typical bridge construction usually has comparatively wide expansion grooves to accommodate the extreme dimensional changes of its construction members due to temperature variation. Elastomeric sealing strips or devices, used to seal these grooves, must be of a comparable lateral extent in order to be advantageously provided with a force fit in these grooves. This size requirement seriously complicates the problem of designing an effective bridge seal and, undoubtedly, is the prime reason that the available seals are not entirely satisfactory. On the one hand, the wide cross section size dictates the use of plural internal walls with numerous interconnections therebetween so that there is no wall length or segment between such interconnections that is that large as to be vulnerable to collapse under its own weight prior to completion of the curing of the elastomeric. On the other hand, the greater number of internal walls, the more difficult it is to extrude the cross section.

Broadly, it is an object of the present invention to provide an improved extruded, elastomeric seal for bridges or the like overcoming the foregoing and other shortcomings of the prior art. Specifically, it is an object to provide a seal in which the cross section has a wall arrangement providing an optimum number of supporting internal wall interconnections with a minimum number of such walls.

A sealing device for expansion grooves in bridges or the like demonstrating objects and advantages of the present invention includes an elastomeric body having exterior walls bounding a comparatively large internal volume, a transversely oriented compression-resisting wall dividing said internal volume into two chambers, and additional internal walls in said two chambers supporting said transverse wall from above and below against collapse. Use is made in the lower chamber of a noteworthy arrangement of criss-crossed walls which provide the requisite support and also contribute to a compact, folded condition of the walls when the seal is laterally compressed.

Figure 2:
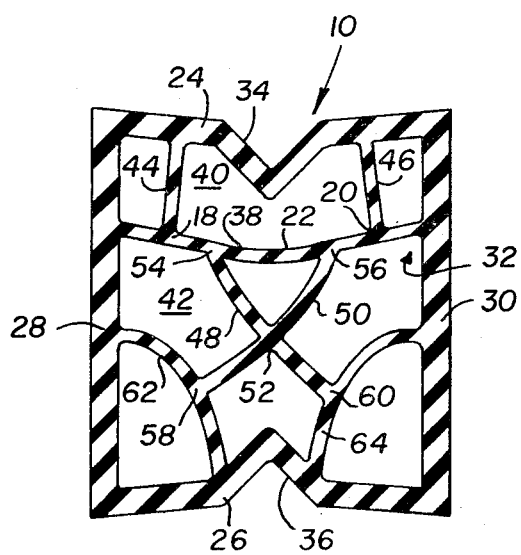
Figure 3:
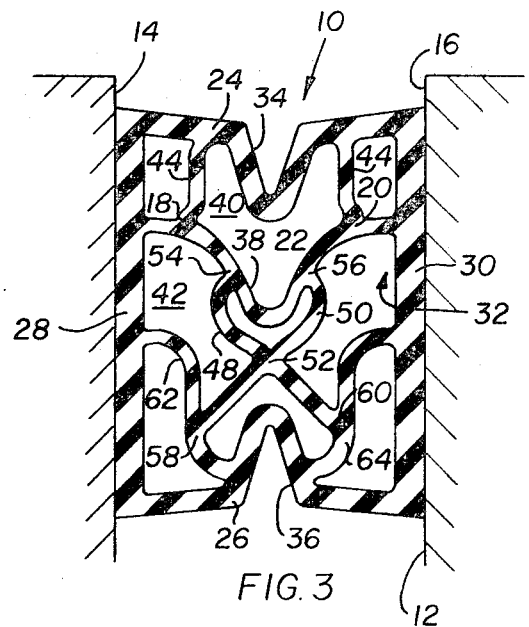
Figure 4:
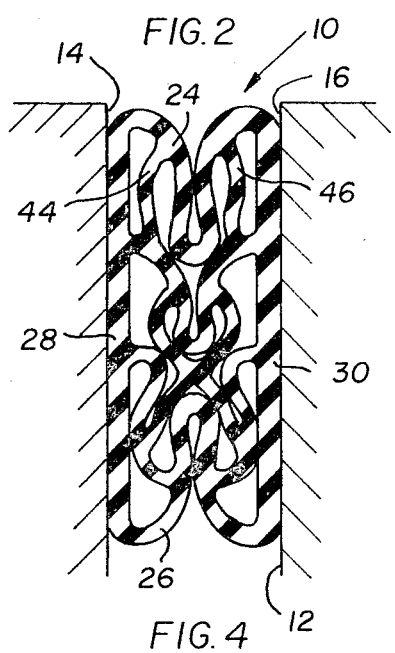

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view illustrating the sealing device hereof in its operative sealing position; and FIGS. 2-4 are each side elevational views showing the sealing device in progressive stages of compression, namely to wit, FIG. 2 illustrates the device in its initial sealing position substantially free of compressive forces, FIG. 3 shows partial compression of the device in its initial sealing position substantially free of compressive forces, FIG. 3 shows partial compression of the device, and FIG. 4 shows maximum compression thereof.

Reference is now made to the drawings, and in particular to FIG. 1, wherein there is shown a sealing device, generally designated 10, demonstrating objects and advantages of the present invention. As illustrated, the sealing device 10 is intended primarily for use in sealing the clearance spaces, as exemplified by space 12, between facing structural members 14 and 16 of a bridge or other such construction, although it will be understood that seal 10 is not limited to this specific end use. In this end use, however, the clearance space 12 is of a comparatively large transverse extent, in most instances exceeding at least 1¾ inches, and thus the uncompressed lateral extent of the seal 10 must also be at least this size in order for the bridge seal 10 to have a friction fit when provided with its operative sealing position between the structural members 14 and 16. This requirement of a comparatively large lateral extent in the size of the bridge seal 10 in turn necessitates that the internal wall construction thereof have a self supporting operative arrangement and design. That is, there must be adequate support for the walls between interconnections therebetween so that these walls do not collapse under their own weight during the initial curing stage of the elastomeric material of which the bridge seal 10 is preferrably fabricated.

More specifically, and as may be better understood from a consideration of FIGS. 2-4, bridge seal 10, in cross section, has an internal wall construction in which transversely oriented walls intersect with each other, as exemplified by the intersection points 18 and 20. Additionally, bridge seal 10 has internal wall portions or segments between such intersection points, as exemplified by the wall segment 22 between the points 18 and 20, which are not supported by any intersection of walls. Thus, such wall segments, like wall segment 22, must otherwise be appropriately supported so that there is no collapse thereof in the critical stage just after the extrusion of the seal device 10 and before the elastomeric material thereof reaches a sufficient stage of curing in which it has the strength to support its own weight. During this critical, initial stage, the elastomeric material only has so-called green strength, which is considerably less strength than it ultimately has after completion of the curing process. The solution to this problem, however, is not to indiscriminently provide walls throughout the internal structure of the device 10 since the existence of these internal walls unavoidably complicates extrusion of the device 10.

In accordance with the present invention, the improved bridge seal 10 hereof is extruded with external walls of extra heavy gauge, namely, to wit, an upper wall 24, a lower wall 26, and two facing side walls 28 and 30, all of which walls cooperate to define an internal volume, generally designated 32, which is generally of the same lateral extent as the space 12 and is therefore, as already noted, in excess of 1¾ inches.

To assure proper functioning of the device 10, particularly in response to closing movement of either one or both of the structural members 14 and 16 due to temperature variation, both the upper and lower walls 24 and 26 are provided with a central depression 34 and 36, respectively, which provides controlled directional movement of the upper and lower walls 24 and 26 upon compression of the device 10. That is, as may best be understood from a progressive examination of FIGS. 2-4, in response to lateral compression of the device 10, the upper and lower walls 24 and 26 move in opposite directions towards the center of the internal volume 32.

Also in aid of the proper functioning of the device 10, there is provided a transverse or laterally extending internal wall, generally designated 38 (of which previously noted wall segment 22 is a part) which, in an obvious manner, offers the desired resistance to lateral compression of the device 10. Normally, the lateral extent of an internal wall, such as wall 38, in an amount which equals or exceeds 1¾ inches, would be such that the wall, immediately following the extrusion and while it only had green strength, will be vulnerable to collapsing under its own weight unless properly and appropriately supported.

To the above end, internal transverse wall 38 which divides the internal volume 32 into an upper chamber 40 and a lower chamber 42 is supported by structure on opposite sides thereof located in these respective chambers. Specifically, in chamber 40, there is provided a pair of spaced, slightly outwardly diverging walls 44 and 46 connected between the upper wall 24 and the wall 38, the lower connections therebetween constituting the previously noted intersection points 18 and 20.

In the lower chamber 42, the wall segment 22 of transverse wall 38 is effectively supported from below by a criss-crossing pair of walls 48 and 50 which, as clearly illustrated, cross at point 52 and are connected to the underside of the wall segment 22, as at points 54 and 56. The lower ends 58 and 60 of the walls 48 and 50, respectively, are each connected to a pair of downwardly bowed walls 62 and 64. Each bowed wall 62, 64 occupies a corner of the lower chamber 42 such that the upper end of each is connected to an adjacent side wall and the lower ends merge together and are connected to the depression 36 of the lower wall 26.

As a consequence of the internal wall construction of the device 10 as herein described, there are no internal openings which are bounded by unsupported wall portions or segments of such an extent that there is insufficient green strength of such wall portions and segments that will permit the collapse thereof under the weight of the material. At the same time, the described internal wall construction is not unduly complicated in either number or position of the internal walls as to adversely effect producing the device 10 by extrusion. Finally, as best illustrated in FIG. 4, the internal wall construction is so arranged that there is collapsing of the internal walls into a compact condition in the event that there is extensive closing movements of the operative members 14 and 16. Specifically, the medial portion or central depression 34 of the upper wall 24 moves into the space previously occupied by the central portion of the internal wall 38 while the same, which also has a slight downward depression, moves into the clearance space which is bounded by the upper portion of the criss-crossing walls 48 and 50. In the other direction, the medial portion 36 of the lower wall 26 moves into the clearance space bounded by the lower portion of the criss-crossing walls 48 and 50.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A sealing device for a clearance space of a comparatively large extent between two facing operative members, said sealing device being formed as an extruded elastomeric body having a wall construction of generally rectangular shape in cross section comprising an upper wall, a lower wall, and a pair of opposing side walls cooperating to define an internal volume generally corresponding in extent to that of said clearance space, a transversely oriented internal wall dividing said internal volume into upper and lower chambers and effective to resist the collapsing of said internal volume upon closing movement of said operative members towards each other, at least two spaced-apart support walls in said upper chamber connected between said upper and said transverse walls, a pair of bowed walls in opposite corners of said lower chamber each connected between said lower wall and one said side wall, a pair of criss-crossing support walls connected in supporting relation between said transverse wall and each of said bowed walls, and central depressions in both said upper wall and said lower wall in facing relation to each other so as to contribute to the flexing thereof in opposite directions into the rectangular shape of said extruded body, said spaced-apart support walls in said upper chamber being located on opposite sides of said central depression in said upper wall, whereby said wall construction has a compact, folded condition incident to closing movement of said operative members.

* * * * *